United States Patent Office 3,395,111
Patented July 30, 1968

3,395,111
PROCESS FOR STABILIZING SOLUTIONS OF HALOGENATED POLYMERS AND SHAPED ARTICLES OBTAINED THEREFROM
Corrado Mazzolini and Francesco Denti, Mestre-Venezia, Italy, assignors to Chatillon Società Anonima Italiana per le Fibre Tessili Artificiali S.p.A., Milan, Italy
No Drawing. Filed Jan. 14, 1964, Ser. No. 337,537
Claims priority, application Italy, Jan. 30, 1963, 1,879/63
3 Claims. (Cl. 260—32.8)

ABSTRACT OF THE DISCLOSURE

A process for stabilizing and simultaneously homogeneously delustering vinyl chloride polymers of a high degree of syndiotacticity comprising incorporating a small amount of zinc oxide into the polymers, preferably by addition of the zinc oxide to a solvent in which the polymers are to be dissolved, and the resulting solutions, fibers, yarns and shaped articles obtained therefrom and thereby stabilized against color degradation caused by light and heat action, as well as being homogeneously delustered.

---

The present invention relates to a process for stabilizing against the light and heat action synthetic polymers and their solutions, that during the working to finished products as fibres, yarns, films etc., are subjected to severe operation conditions causing a color degradation.

More particularly the invention relates to the treatment of vinyl chloride polymers having a high syndiotacticity degree and solutions thereof, so as to simultaneously accomplished stabilizing to heat and delustering of fibers and yarns obtained from said solutions.

The term polymers of vinyl chloride having a high syndiotacticity degree as used herein and in the claims is understood to comprise both homopolymers of vinyl chloride having a syndiotacticity degree higher than about 2 (the syndiotacticity degree being defined by the absorption ratio of bands I.R. D 635 and D 692 cm.$^{-1}$ as described in Burleigh J.A.C.S., 82, p. 749—1960) as well as copolymers or mixtures thereof having at least 85% by weight of vinyl chloride.

It is known that vinyl polymers and solutions thereof generally give undesired color degradation under the action of light and heat, so it has been proposed in order to avoid such difficulties to add to the polymer compositions or their solutions small amounts of organic or inorganic compounds as stabilizing agents, among which suitable compounds are salts of inorganic acids, such as phosphates of alkaline or alkaline-earth metals, alkaline phosphites, lead phosphites, borates, chromates, arsenates, silicates, sulphates, carbonates, thiosulphates, hyposulphites, of alkaline, alkaline-earth metals, lead etc., salts of organic acids, such as alkaline and alkaline-earth naphthenates, maleates, adipates, and salicylates, organic compounds, such as urea, thiourea, monoethanolamine, succinamide, phthalimide, formamide, styrene, ethylene glycol, diethyleneglycol, polyethyleneglycol, polypropyleneglycol, epichlorohydrin, methylepoxystearate, benzylepoxystearate, metal soaps, such as lithium stearate, lithium ricinoleate, magnesium stearate, calcium stearate, calcium ricinoleate, organo-tin compounds etc.

It is furthermore known (see copending U.S. application Ser. No. 269,257 filed Apr. 1, 1963) that vinyl chloride polymers having high syndiotacticity degree are hardly soluble or are even insoluble in the usual solvents at the temperatures normally adopted for preparing solutions suitable to obtain shaped articles as fibers, filaments etc. It is possible to obtain solutions of the above said polymers only by operating at temperatures higher than at least 100° C.

As a result the damage deriving from heat action on these heated polymers is greater than that arising in the working of normal polyvinylchloride. The red-brown color developed in the heated polymers and resulting also in the shaped articles obtained therefrom is especially pronounced and resistant and the stabilization is very difficult.

The mechanism of the discoloration of the vinyl chloride polymers is not ascertained, although various hypothesis have been made. For instance it has been said that the discoloration probably occurs from a loss of hydrogen chloride from the polymeric chain forming unsaturated bonds, which in turn give rise to the production of hydrogen chloride with a chain reaction, or from a loss from the polymer of a Cl-radical with subsequent oxidation of the residual radicals.

In any case it appears that the first reason of the color degradation to be investigated is the presence of various impurities in the solvents.

It is further known and is normally used in preparing the polymer solutions for the production of fibers to add a delustrant product according to the requirements of the textile industry. The product generally used for that purpose is titanium dioxide, which however is not only expensive, but presents also the inconvenience of reducing the stability of the fiber to light.

It has now been found, according to the present invention, that vinyl chloride polymers having high syndiotacticity degree and particularly their solutions and shaped articles obtained therefrom can be efficiently stabilized against the prolonged action of light and heat and simultaneously delustered by adding small amounts of an oxide of a metal of Group II–B of the periodic system.

The process of the invention is accomplished by dissolving the polymers in a suitable solvent in the presence in the solution of small amounts of one or more oxides of metals of Group II–B of the periodic system so as to prevent color degradation while simultaneously obtaining a delustering effect.

According to one of the preferred embodiments of the invention, vinyl chloride polymers, having a syndiotacticity degree higher than about 2 and an intrinsic viscosity comprised between about 1.3 and 1.4 ml. gr.$^{-1}$ (as determined in cyclohexanone at 25° C.), are dissolved in suitable solvents as for instance dimethylformamide, dimethylacetamide, cyclohexanone etc., to which are added small amounts of an oxide of a metal of the Group II–B of the periodic system as for instance zinc oxide, which acts as stabilizing and delustering compound.

The stabilizing and delustering compound is preferably added to the cold or pre-heated solvent before the addition of the polymer in order to prevent the arising of color degradation that can be caused by the initial contact between the polymer and the solvent, in amounts varying from about 0.1 to about 2.0% by weight based on the weight of the polymer.

The process according to the invention makes it possible to obtain polymer solutions, particularly vinyl chloride polymers having a high syndiotacticity degree and shaped articles derived therefrom as fibers, filaments etc., that are resistant to the degradation effects for prolonged periods of exposure to light and high temperatures and are also delustered as required for application in the various fields of the textile industry.

The stabilizing action obtained by employing the oxides of the metals of the Group II–B of the periodic system, as for instance zinc oxide, is determined with reference to the color of the fibers obtained from spinning solutions containing such metal oxides. The spinning of the fibers may be accomplished by usual dry or wet spinning processes.

Thus, a solution in cyclohexanone of the vinyl chloride polymers having a high syndiotacticity degree and containing the stabilizing and delustering compound can be spun by the dry or wet way. In a dry spinning process the solution is extruded through a 30 hole spinneret with a taking up speed of 150 m./1' and the solvent is subsequently caused to evaporate in a column with hot air circulation at temperatures between about 150°–180° C.

In a wet spinning process the spinning solution is extruded through a multi-hole spinneret in a coagulating bath constituted by the solvent and suitable coagulant mixture, and the filaments are then subjected to the washing, finishing and drying treatments. It will be apparent that the particle size of the zinc oxide which has been incorporated in the polymer solvent must be sufficiently small so as to readily pass through the holes of the spinneret.

The fibers and yarns obtained by the process of the invention present a highly pure original color and have good resistance to high temperatures and to light.

The results and advantages of the invention will be better understood through the following examples, in which Examples 1 and 2 relating polymer solutions not stabilized according to the invention give comparison values.

Example 1

100 parts by weight of vinyl chloride polymer having a syndiotacticity degree of about 2.2 and an intrinsic viscosity of 1.35 ml. gr.$^{-1}$ determined in cyclohexanone at 25° C. are dissolved while stirring and heating during 30 minutes at 140° C. in 500 parts by weight of cyclohexanone to which has been added 1 part of titanium dioxide.

The solution is extruded through a 30 hole spinneret with a taking up speed of 150 m./1' in a column with hot air circulation at temperatures of from 150° to 180° C. to evaporate the solvent.

The obtained fiber presents a violet brown color that as determined at the G.E. spectrophotometer gives the following values:

DWL _____ millimicrons__ 495
PI _____ percent__ 94.3
B _____ do____ 20.6 wherein DWL represents the dominant wave length, PI represents the purity index and indicates how near the color shade is to the neutral color (white-grey-black axis of the color solid), B represents the brightness and indicates how near the color in regard to the incident light reflectance is to white.

Example 2

100 parts by weight of vinyl chloride polymer having syndiotacticity degree of about 2.2 and an intrinsic viscosity of 1.35 ml. gr.$^{-1}$ determined in cyclohexanone at 25° C., are dissolved while stirring and heating during 30 minutes at 140° C. in 500 parts by weight of cyclohexanone to which has been previously added 0.5 part by weight of dibutyl-tinmercaptan and 1 part by weight of titanium dioxide.

The solution treated as described in Example 1 gives a fiber the color of which examined with the G.E. spectrophotometer gives the following values:

DWL _____ millimicrons__ 575
PI _____ percent__ 95.5
B _____ do____ 75

The fiber examined to the fadeometer to determine the stability to the ultraviolet rays presents a solidity value of 4, referred to the scale of grey according to the "Solidities code."

Example 3

100 parts by weight of vinyl chloride polymer having a syndiotacticity degree of about 2.2 and an intrinsic viscosity of 1.35 ml. gr.$^{-1}$ determined in cyclohexanone at 25° C., are dissolved at 140° C. while stirring during 30 minutes, in 500 parts of cyclohexanone to which has been previously added 0.2 part by weight of zinc oxide.

The solution treated as described in Example 1 gives a fiber, having a color that determined with the G.E. spectrophotometer gives the following values:

DWL _____ millimicrons__ 590
PI _____ percent__ 96
B _____ do____ 45

The solidity determined to the fadeometer is 5.

Example 4

100 parts by weight of vinyl chloride polymer having a syndiotacticity degree of about 2.2 and an intrinsic viscosity of 1.35 ml. gr.$^{-1}$ determined in cyclohexanone at 25° C., are dissolved at 140° C. while stirring during 30 minutes in cyclohexanone to which has been previously added 0.6 part by weight of zinc oxide.

The solution treated as described in Example 1 gives a fiber having a color, that examined with the G.E. spectrophotometer presents the following values:

DWL _____ millimicrons__ 575
PI _____ percent__ 95.5
B _____ do____ 75

The solidity determined to the fadeometer is 5.

Example 5

100 parts by weight of vinyl chloride polymer having a syndiotacticity degree of about 2.2 and an intrinsic viscosity of 1.35 ml. gr.$^{-1}$ determined in cyclohexanone, are dissolved at 140° C. while stirring during 30 minutes in 500 parts of cyclohexanone to which has been previously added 1 part by weight of zinc oxide.

The solution treated as in Example 1 gives a fiber, the color of which examined with the G.E. spectrophotometer presents the following values:

DWL _____ millimicrons__ 570
PI _____ percent__ 96.5
B _____ do____ 82

The solidity determined with the fadeometer is 5.

Example 6

100 parts by weight of vinyl chloride polymer having a syndiotacticity degree of about 2.2 and an intrinsic viscosity of 1.5 ml. gr.$^{-1}$ determined in cyclohexanone at 25° C., are dissolved at 140° C. while stirring during 30 minutes in 500 parts of cyclohexanone to which has been previously added 0.2 part of zinc oxide.

The solution is extruded through a spinneret having 10,000 holes of 100μ diameter, in a coagulating bath containing a mixture of 40% cyclohexanone, 20% of ethyl alcohol and 40% of water.

The so obtained tow is washed with a solution of ethyl alcohol and water, stretched, finished, dried, crimped and then cut. The obtained staple presents an original color, that examined at the G.E. spectrophotometer gives the following values:

DWL _____ millimicrons__ 572
PI _____ percent__ 97
B _____ do____ 84 furthermore the resulting staple is homogeneously delustered.

We claim:

1. In a process for preparation of textile fibers of a vinyl chloride polymer containing at least 85% by weight of vinyl chloride and having a syndiotactic degree higher than about 2 wherein said polymer is dissolved in a solvent at temperatures higher than about 100° C. and is spun into fibers by extrusion of the solution through a multi-hole spinneret, the improvement comprising adding, as the sole essential delustering and stabilizing agent, from about 0.1 to about 2% by weight based on the weight of the polymer, of zinc oxide to the solvent before the addition of the polymer, the particle size of the zinc oxide being sufficiently small to pass through the holes of the spinneret.

2. The process of claim 1 wherein the polymer solvent is cyclohexanone.

3. Textile fibers of polyvinylchloride containing at least 85% by weight of vinyl chloride, having a syndiotactic degree higher than about 2, and containing as the sole essential delustering and stabilizing agent from about 0.1 to about 2% by weight of zinc oxide and thereby stabilized against color degradation caused by light and heat action, as well as being homogeneously delustered, said fibers resulting from extrusion of a solution of said polymer through a multi-hole spinneret and the zinc oxide being of sufficiently small particle size to pass through the holes of said spinneret.

References Cited

UNITED STATES PATENTS

| 2,048,248 | 7/1936 | Dreyfus et al. | 106—192 |
| 2,302,361 | 11/1942 | Yngve | 206—41 |
| 2,819,173 | 1/1958 | Dithmar | 106—192 |
| 3,183,201 | 5/1965 | Shimeha et al. | 206—32.8 |

FOREIGN PATENTS

| 695,276 | 8/1953 | Great Britain. |
| 238,653 | 4/1960 | Australia. |

OTHER REFERENCES

Andrews, General Electric Review, vol. XXIV, No. 10, October 1921, p. 866.

Lally et al., "Stabilization of Polyvinyl Chloride," Modern Plastics, December 1949, p. 156.

ALLAN LIEBERMAN, *Primary Examiner.*